US 9,873,130 B2

(12) United States Patent
Adey et al.

(10) Patent No.: US 9,873,130 B2
(45) Date of Patent: Jan. 23, 2018

(54) SEPARATOR DEVICE

(71) Applicant: Adey Holdings (2008) Limited, Cheltenham (GB)

(72) Inventors: Christopher Adey, Cheltenham (GB); Simon Downie, Cheltenham (GB); Matthew Taylor, Cheltenham (GB)

(73) Assignee: ADEY HOLDINGS (2008) LIMITED, Cheltenham (GB)

( * ) Notice: Subject to any disclaimer, the term of this patent is extended or adjusted under 35 U.S.C. 154(b) by 344 days.

(21) Appl. No.: 14/402,968

(22) PCT Filed: May 21, 2013

(86) PCT No.: PCT/GB2013/051329
§ 371 (c)(1),
(2) Date: Nov. 21, 2014

(87) PCT Pub. No.: WO2013/175200
PCT Pub. Date: Nov. 28, 2013

(65) Prior Publication Data
US 2015/0165448 A1   Jun. 18, 2015

(30) Foreign Application Priority Data

May 21, 2012 (GB) .................................. 1208917.3
Nov. 2, 2012 (GB) .................................. 1219752.1

(51) Int. Cl.
*B01D 35/06* (2006.01)
*B03C 1/28* (2006.01)
(Continued)

(52) U.S. Cl.
CPC ............ *B04C 5/14* (2013.01); *B01D 21/0009* (2013.01); *B01D 21/2411* (2013.01);
(Continued)

(58) Field of Classification Search
CPC .. B04C 5/14; B04C 5/185; B04C 3/06; B03C 1/02; B03C 1/14; B03C 1/30;
(Continued)

(56) References Cited

U.S. PATENT DOCUMENTS 3,072,260 A * 1/1963 Szwargulski .......... B01D 29/33
210/130
3,412,854 A 11/1968 Klein
(Continued)

FOREIGN PATENT DOCUMENTS

CN    2176836 Y    9/1994
CN    2329419 Y    7/1999
(Continued)

*Primary Examiner* — David C Mellon
(74) *Attorney, Agent, or Firm* — Michael E. Dockins; Shumaker, Loop & Kendrick, LLP (57) ABSTRACT

A separator device for removing particles from suspension in a fluid includes a housing having first and second apertures for ingress and egress of fluid into and out of the housing. A first separator chamber is disposed at one end of the housing. A second separator chamber is disposed at the other end of the housing. A central chamber is disposed between the first and second separator chambers. The first and second separator chambers are apertured for ingress and egress of fluid from the central chamber, and each contains obstruction means to slow the flow of fluid within the chamber.

25 Claims, 9 Drawing Sheets

(51) Int. Cl.
    *B04C 5/14*         (2006.01)
    *B01D 21/00*       (2006.01)
    *B01D 21/24*       (2006.01)
    *B01D 21/26*       (2006.01)
    *B01D 35/30*       (2006.01)
    *B01D 29/90*       (2006.01)
    *B21D 39/04*       (2006.01)
    *B03C 1/0355*     (2006.01)
    *F17D 3/16*        (2006.01)
    *F24D 19/00*       (2006.01)
    *B04C 3/06*        (2006.01)
    *B04C 5/185*      (2006.01)
    *E03B 7/07*        (2006.01)
    *B03C 1/14*        (2006.01)
    *B03C 1/30*        (2006.01)
    *C02F 1/48*        (2006.01)
    *F16L 21/00*       (2006.01)
    *F16L 29/00*       (2006.01)
    *B03C 1/02*        (2006.01)
    *C02F 101/20*      (2006.01)
    *F16L 55/24*       (2006.01)

(52) U.S. Cl.
    CPC ......... *B01D 21/2483* (2013.01); *B01D 21/26* (2013.01); *B01D 21/267* (2013.01); *B01D 29/908* (2013.01); *B01D 35/06* (2013.01); *B01D 35/303* (2013.01); *B03C 1/02* (2013.01); *B03C 1/0355* (2013.01); *B03C 1/14* (2013.01); *B03C 1/286* (2013.01); *B03C 1/288* (2013.01); *B03C 1/30* (2013.01); *B04C 3/06* (2013.01); *B04C 5/185* (2013.01); *B21D 39/044* (2013.01); *C02F 1/488* (2013.01); *E03B 7/074* (2013.01); *F16L 21/00* (2013.01); *F16L 29/007* (2013.01); *F17D 3/16* (2013.01); *F24D 19/0092* (2013.01); *B01D 21/0042* (2013.01); *B01D 2201/302* (2013.01); *B01D 2201/4023* (2013.01); *B01D 2221/02* (2013.01); *B03C 2201/18* (2013.01); *B03C 2201/20* (2013.01); *B03C 2201/28* (2013.01); *C02F 2101/203* (2013.01); *C02F 2201/48* (2013.01); *C02F 2303/22* (2013.01); *F16L 55/24* (2013.01); *Y10T 137/794* (2015.04)

(58) Field of Classification Search
    CPC ..... B03C 1/288; B03C 1/286; B03C 2201/20; B03C 2201/28; B03C 2201/18; C02F 1/488; C02F 2303/22; C02F 2201/48; C02F 2101/203; F16L 21/00; F16L 29/007; F16L 55/24; B01D 21/26; B01D 21/2411; B01D 35/06; B01D 35/303; B01D 29/908; B01D 21/0009; B01D 21/2483; B01D 21/267; B01D 2201/302; B01D 21/0042; B01D 2201/4023; B01D 2221/02; E03B 7/074; F17D 3/16; F24D 19/0092; Y10T 137/794

See application file for complete search history.

(56) References Cited

U.S. PATENT DOCUMENTS

| | | | | |
|---|---|---|---|---|
| 3,669,274 | A * | 6/1972 | Happ | C02F 1/481 210/222 |
| 4,585,553 | A * | 4/1986 | Hikosaka | B01D 29/114 210/107 |
| 5,507,529 | A * | 4/1996 | Martins | F16L 37/56 285/124.2 |
| 6,143,171 | A * | 11/2000 | Van Aarsen | B01J 19/087 123/538 |
| 6,458,274 | B1 | 10/2002 | Mori | |
| 9,463,471 | B2 * | 10/2016 | Taylor | B01D 21/0009 |
| 2006/0283783 | A1 * | 12/2006 | Adey | B03C 1/284 209/39 |
| 2009/0261028 | A1 * | 10/2009 | Yamasaki | C02F 1/006 210/222 |
| 2012/0067807 | A1 | 3/2012 | Lappeman | |
| 2013/0248433 | A1 * | 9/2013 | Downie | B01D 21/0009 210/223 |
| 2015/0129491 | A1 * | 5/2015 | Adey | B01D 21/0009 210/512.1 |
| 2015/0151220 | A1 * | 6/2015 | Adey | B03C 1/286 210/512.1 |
| 2017/0043354 | A1 * | 2/2017 | Adey | B01D 21/0009 |

FOREIGN PATENT DOCUMENTS

| | | | | |
|---|---|---|---|---|
| DE | 4404661 | A1 | 8/1995 | |
| DE | 1020070496206 | A1 | 4/2009 | |
| DE | 202010008759 | U1 | 1/2012 | |
| EP | 1855061 | A2 | 11/2007 | |
| FR | 2778178 | A1 | 11/1999 | |
| GB | 855928 | A * | 12/1960 | ............ B01D 35/06 |
| GB | 2233727 | A | 1/1991 | |
| GB | 2450335 | A | 12/2008 | |
| GB | 2469145 | A | 10/2010 | |
| RU | 2175954 | C1 | 11/2001 | |
| RU | 2205701 | C1 | 6/2003 | |
| WO | 2012073029 | A1 | 6/2012 | |

* cited by examiner

SEPARATOR DEVICE

CROSS-REFERENCE TO RELATED APPLICATIONS

This application is a National Stage of International Application No. PCT/GB2013/051329, filed May 21, 2013, which claims priority to GB 1219752.1, filed Nov. 2, 2012, which in turn claims priority to GB 1208917.3, filed May 21, 2012. The entire disclosures of the above applications are hereby incorporated herein by reference.

FIELD

The present disclosure relates to a separator device suitable for separating particles from a fluid flow and particularly but not exclusively to a separator device for use in a hydronic heating system.

BACKGROUND

In a typical heating system, water is circulated by a pump through several radiators, possibly a heat exchanger in a hot water cylinder, and a boiler. During circulation, solid particles (for example, iron oxide) which have come loose from the interior of the radiators and pipework can become suspended in the water. Solid particles can also be present as contaminants in the water originally supplied to the system, and the water can become contaminated by dirt where an open expansion tank forms part of the system. These solid particles can cause malfunction if they build up in the boiler or pump, and reduce the effectiveness of the heating system by restricting the flow of water and clogging radiators. The water in a heating system should therefore be continually cleaned to remove solid particles as far as possible.

Various devices are known for removing particles from suspension in a flow of water. Typically these devices include a magnet for attracting ferrous particles, and may also include mechanical separation means for removing nonmagnetic particles. Nonmagnetic particles may be removed by causing a portion of the water to flow through a separation chamber, within which obstruction means are disposed to slow the flow. Particles will then fall out of suspension and become trapped in cavities, which can easily be cleaned during an annual service. Only a portion of the flow is slowed, so that the overall flow rate in the heating circuit is not significantly reduced. A device of this type is disclosed in the applicant's co-pending applications GB2486173 and GB2486172.

These prior devices typically consist of a cylindrical housing, a magnet disposed within the housing along its longitudinal axis, and a mechanical separation chamber disposed at a lower end of the housing. An inlet and an outlet are provided on a side wall of the housing, typically one above the other. The inlet and outlet are configured to set up a swirl of water within the housing and are tangential or substantially tangential to the housing.

The magnet is typically sleeved so that magnetic particles do not stick directly to the magnet, but to the sleeve around the magnet. The magnet may be removed from the sleeve when the device is cleaned and the particles will simply fall away. However, providing a sleeve around the magnet does reduce the magnetic field strength, and therefore the effectiveness of the filter. The sleeve should therefore be as thin as possible. Due to manufacturing limitations, the thickness of the sleeve is typically great enough to substantially attenuate the magnetic field.

Due to the very tight space within which a device may need to be installed, particularly if it is being retrofitted to an existing installation, the tangential inlet and outlet may impose an unwelcome constraint upon the installer. In some cases it may simply not be possible to fit a device of suitable capacity with tangential or substantially tangential inlets. A separator also has to be oriented in a particular way for it to operate as intended and usually this is with the cylindrical housing extending substantially vertically, so that non-magnetic debris separated from the flow can drop to a collection area at the bottom of the separator. If it is installed in an incorrect orientation, the error may not be immediately obvious and may not be noticed until a service. During this time, the effectiveness of the separation device will be substantially reduced, and it may be completely ineffective.

Separation devices are typically fitted to either the flow or return pipe of the heating circuit. Two cuts must be made in the pipe at a set distance apart, and right angle connectors are then fitted to the open ends. If two separate right angle connectors are used, then the installer must be careful to ensure that the extent to which they are fitted to the open ends of the pipe is such that the vertical distance between the perpendicular sections of the right angle connectors is exactly correct to fit the separation device. Any error is time-consuming to correct because a section of the flow or return pipe may need to be cut out and replaced.

It is an object of this invention to provide a separator device which reduces or substantially obviates the above mentioned problems.

SUMMARY

According to a first aspect of the present invention, there is provided a separator device for removing particles from suspension in a fluid comprising:
   a housing, having first and second apertures for ingress and egress of fluid into and out of the housing;
   a first separator chamber disposed at one end of the housing;
   a second separator chamber disposed at the other end of the housing,
   and a central chamber disposed between the first and second separator chambers, the first and second separator chambers being apertured for ingress and egress of fluid from the central chamber and each containing obstruction means to slow the flow of fluid within the chamber.

This arrangement is advantageous because, by providing separating chambers at either end of the separator, one may always be disposed in the optimal position for effectively removing particles from suspension in the fluid, whichever of the first and second apertures is used as the inlet. The device can be installed with the inlet and outlet either way around, providing additional flexibility to an installer who may be working in an area where space is at a premium. For example, the device may be installed either above or below a boiler, on either the flow or return of the heating circuit. It has also been found that in a separator of this type, that most effective separation is achieved in the upper separation chamber.

Means may be provided to set up a swirl of fluid within the housing.

A magnet may be provided in the central chamber. The magnet attracts ferrous particles from the fluid in the central chamber.

The means of obstruction in at least one of the first and second separator chambers may comprise at least in part of a plurality of substantially planar walls. The planar walls may be disposed radially. Such means of obstruction may alternatively or additionally comprise of a plurality of substantially cylindrical protrusions.

Where substantially cylindrical protrusions are provided in addition to planar walls, the substantially cylindrical protrusions may extend through and above the substantially cylindrical walls.

The planar walls slow the flow of the fluid, and also define cavities between adjacent walls in which solid particles are prone to collect. The cylindrical protrusions provide a further barrier to the flow of fluid, and increase the overall distance which must be traversed by the fluid, thus increasing the quantity of solid particles which are removed from suspension in the chamber.

The means of obstruction in at least one of the first and second separator chambers may comprise at least in part of one or more curved walls. The curved walls define a lengthy and complex pathway through which water must flow.

Where curved walls are provided, at least one reverse curved wall may be included. The curved walls, whether or not including a reverse curved wall, may form concave collection areas for collection of particles. The concave collection areas may face in different directions.

The advantage of curved walls forming concave collection areas, which may face in different directions, is that they are able to effectively remove particles from the flow when positioned in any orientation, for example, if the separator is not fitted vertically, but at an angle to the vertical.

The arrangement of curved walls within either or both of the first and second separator chambers may be reflectively and/or rotationally symmetrical.

The first and second separating chambers may be removable from the housing. The first and second chambers may be provided as part of a single removable insert, the separator chambers being mounted at either end of a central section. Removal from the housing facilitates effortless cleaning away of particles which have built up in the chambers.

The first separating chamber may be open to the housing at its upper end. The first chamber may have inlets in the underside from the central chamber, which may spiral upwardly into the first chamber. Where the inlets spiral upwardly, they may spiral in opposing arcuate directions, guiding the flow into the chamber irrespective of the rotational direction of swirl in the central chamber.

The second separating chamber may comprise a tray and a roof section. The roof section may be attached to the central section, and the tray may be removable for cleaning. The apertures for ingress and egress of fluid into and out of the second separation chambers may be in the roof of the chamber.

A flow guide may be provided on the roof section of the second separating chamber, extending upwardly and radially from the roof section and overhanging the apertures in opposing directions for directing flow into the second chamber from both sides of the flow guide, for capturing flow irrespective of the rotational direction of swirl in the central chamber.

The flow guide serves to guide a portion of the swirling flow of fluid through the separation chamber, whilst allowing the overall flow rate of the heating circuit to be substantially maintained.

The housing may be closed by a watertight lid. This allows the unit to be sealed when in normal operation as part of, for example, a closed heating circuit, but easily opened during service for removal of solid particles which have been removed from the fluid by the device.

A bleed valve may be provided at the upper end of the housing, and a drain valve may be provided in the base of the housing. In use, after isolating the device from the heating circuit, the upper and lower valves are opened to drain the fluid from the housing. The lower valve is then closed, and the system may be dosed with a fluid, for example a corrosion inhibitor, via the upper valve. The separator device is then reconnected to the heating circuit, air being forced out of the bleed valve. When all the air has been removed the bleed valve is closed, and the system refilled and/or re-pressurized as necessary.

The swirl of fluid within the housing may be set up by means of deflectors which are mounted within the apertures in the housing. The deflectors may extend to some degree into the central chamber of the housing and may be moulded into the wall of the housing. The advantage of this arrangement is that the inlet and outlet pipes can enter the housing parallel to each other, providing ease of fitting.

According to a second aspect of the invention, a sleeve for a magnet is provided in the form of a hollow cylinder, having a curved wall with thickness less than 0.8 mm, and preferably less than 0.7 mm. A thin-walled sleeve is advantageous because the attenuation of the magnetic field is minimized.

The sleeve may be molded from plastics, and reinforcing ribs and/or spines may be provided. Reinforcing ribs and spines retain the structural strength of the magnetic sleeve, allowing the thickness of the walls to be reduced. The ribs and spines also improve the flow of plastic in a mold when the sleeve is manufactured, removing another limitation on minimum sleeve thickness.

According to a third aspect of the invention, there is provided an in line fitment for connection of a filter to a pipe, comprising first and second fluid-carrying portions and a non-fluid-carrying spacer for linking the first and second fluid-carrying portions, each fluid-carrying portion including a socket for receiving an open end of a pipe and a connector for connection of the filter, the socket of the first fluid-carrying portion having a pipe receiving depth greater than that of the socket of the second fluid-carrying portion, and the sockets of the first and second fluid-carrying portions being positioned on a common axis and facing away from each other when the fluid-carrying portions are linked by the spacer.

According to a further aspect of the invention, there is provided an in-line fitment for connection of a filter to a pipe, comprising first and second in line sockets for accepting the open ends of fluid carrying pipes, the first and second sockets being linked by a spacer, and the first socket having a pipe receiving depth greater than that of the second socket.

According to a further aspect of the invention, there is provided an in-line fitment for connection of a filter to a pipe, comprising independent first and second fluid-carrying portions, and a spacer for setting the distance between the fluid-carrying portions, each fluid-carrying portion including a socket for receiving an open end of a pipe and a connector for connection of the filter.

According to yet a further aspect of the invention, there is provided an in-line fitment for connection of a filter to a pipe, comprising first and second independent fluid-carrying portions for connection to the pipe, the first fluid carrying portion directing flow out of the line of the pipe and the second fluid carrying portion directing flow back into the line of the pipe, the first and second fluid-carrying portions being linkable by a spacer for setting the distance between the fluid-carrying portions, the first and second fluid-carrying portions each including sockets for connection to the pipe, the socket of the first fluid-carrying portion having a pipe receiving depth greater than the pipe receiving depth of the socket of the second fluid-carrying portion.

In some embodiments, the spacer may be hollow. However, the spacer is non-fluid-carrying in the sense that it is not in fluid communication with the connector or the socket of either of the first and second fluid-carrying portions.

The in-line fitment may be used to install the separator device according to the first aspect of the invention onto, for example, a central heating pipe. The in-line fitment may also be suitable for use with other filtering, cleaning or processing devices which need to be fitted to a fluid-carrying pipe.

The in-line fitment is advantageous because it can be easily fitted to a pipe. First a section of a certain length is cut from the pipe, leaving two open ends of the pipe. The first socket is then fitted to a first open end of the pipe. Due to the greater pipe receiving depth of the first socket, the fitment can move parallel to the pipe whilst engaged with the first open end of the pipe. The second socket can afterwards be engaged with a second open end of the pipe by sliding the fitment towards the first open end, and then back down over the second open end. Because the sockets are joined together by a spacer, the correct distance between the sockets is always maintained, whilst allowing fitting to a pipe which is already anchored to a wall.

The spacer may be removable, so that the fitment may be used either as one connected piece or as two separate fluid-carrying pieces.

A removable spacer further assists with fitting, because the two sockets may be attached to open ends of the pipe independently, without the need for any manipulation of the pipe ends. The correct distance between the sockets is nonetheless easy to achieve, because the first socket, having a greater pipe receiving depth, can be moved parallel to the pipe and the spacer then refitted between the sockets.

A removable spacer also allows a filter having vertically-oriented inlet and outlet ports to be fitted to a cut section of pipe which is non-vertical in orientation. For example, a filter with vertically-oriented inlet and outlet ports may need to be fitted to a pipe running horizontally or diagonally. Also, a filter may need to be fitted with an inlet pipe at right angles to an outlet pipe.

The connector of each fluid-carrying portion may have a longitudinal axis substantially at right angles to a longitudinal axis of the socket of the respective fluid-carrying portion.

Typically, a filter will be fitted to a pipe which runs parallel to a wall or other flat surface. Where each fluid-carrying portion has a connector at right angles to a pipe socket, effectively forming a 90° bend, a filter with inlet and outlet ports extending horizontally from its side can be mounted against a vertical wall, without further components being required.

A valve may be provided on each fluid-carrying portion for controlling the flow of fluid between the socket and the connector of the fluid-carrying portion. The valve may be used to prevent flow through the fluid-carrying portions, that is, to cut off the pipe socket of each fluid-carrying portion from its respective connector.

Where the fitment is used to connect a filter to a central heating system, it is useful to be able to isolate the filter from the central heating circuit. This allows the filter to be opened for cleaning, without opening the central heating circuit and allowing heating fluid to escape.

A plug may be provided on each fluid carrying portion, on an end of the fluid carrying portion opposing the socket, the plug corresponding with a socket on the spacer for releasably engaging the spacer with the fluid-carrying portion.

A plug and socket connection provides for very easy fitting or location of the spacer between the fluid-carrying portions. With plugs on each fluid-carrying portion opposing each other when the fluid-carrying portions are fitted to the spacer, the spacer can only be removed where there is space to move the fluid-carrying portions away from each other and from the spacer. In other words, the spacer can easily be fitted and removed when the fitment is not installed, but cannot come away when the fitment is secured to the open ends of a pipe.

The plugs may each include a circular section and a dog section having at least one straight edge. A recess may be provided around the circumference of the circular section, an O-ring being provided in the recess. A circular section with an O-ring allows for a tight fitting of the plug into the corresponding socket, which is nonetheless easy to remove. The dog section prevents rotation of the plug in the socket, ensuring that the connectors of the first and second fluid-carrying portions remain correctly aligned for fitting of a filter.

Removable caps may be provided for fitting over the plugs of the fluid-carrying sections. The removable caps may be made from flexible plastics. When the spacer is not required, it is advantageous to cover the plugs.

A fitting jig may be provided, the fitting jig including a rigid member having two parallel apertures therethrough, the parallel apertures being adapted to receive the connectors of the first and second fluid-carrying pipes. The thickness of the rigid member in a direction parallel to the apertures may be at least half of a length of the connectors.

In use, the fluid-carrying portions may be connected to the spacer, and the fitting jig installed over the connectors. This ensures that all parts of the fitment are correctly aligned. The first fluid-carrying section may then be installed on the open end of a pipe, as described above, with the greater pipe receiving depth of the first fluid-carrying section allowing the first fluid-carrying section to be moved onto the open end of the pipe, and then the second fluid-carrying section to be moved in the other direction, over another open end of the pipe.

DRAWINGS

For a better understanding of the present invention, and to show more clearly how it may be carried into effect, reference will now be made, by way of example only, to the accompanying drawings, in which.

DETAILED DESCRIPTION

Figure 1:
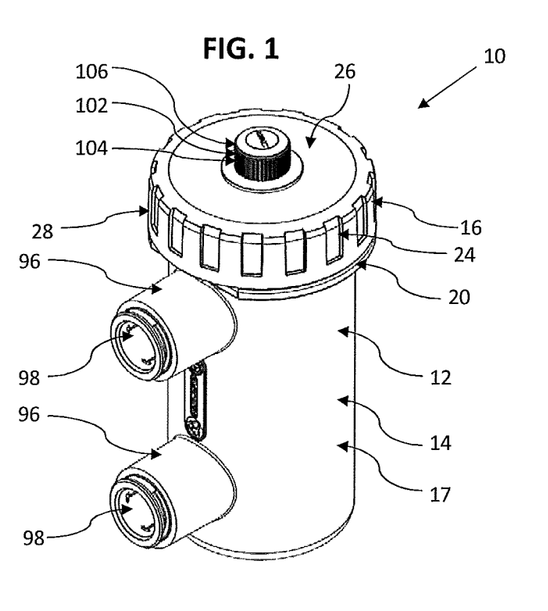
FIG. 1 shows a perspective view of a separator device according to the first aspect of the invention.
Figure 2:
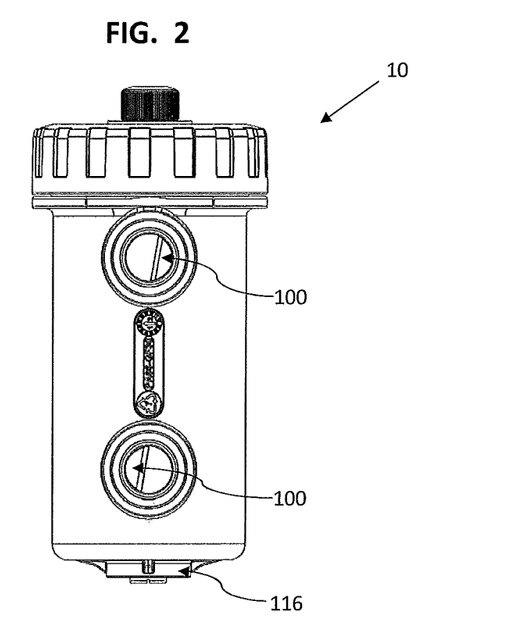
FIG. 2 shows a front view of the separator device of FIG. 1.
Figure 3:
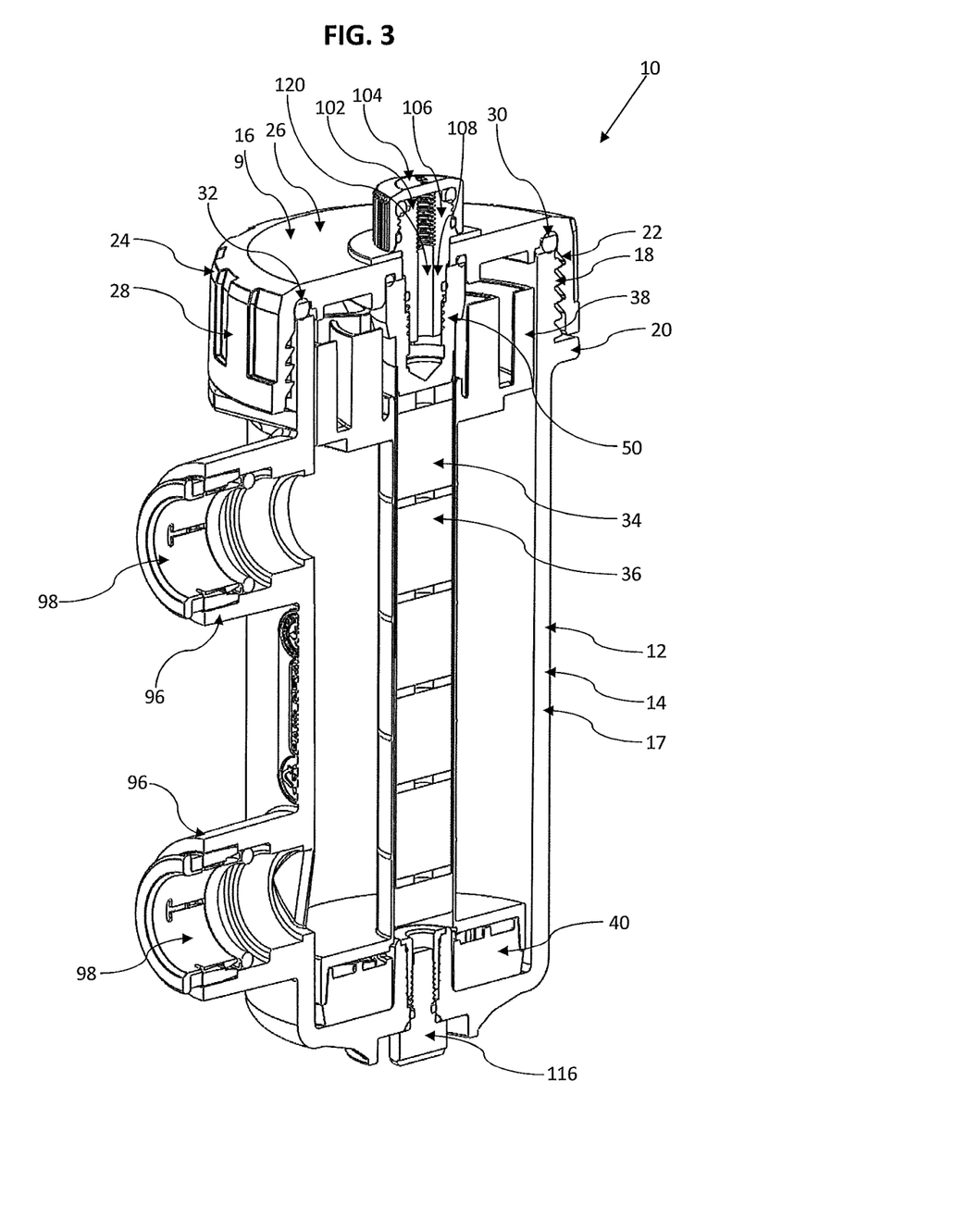
FIG. 3 shows a perspective cut-away view of the separator device of FIG. 1.

Referring firstly to FIGS. 1 to 3, a separator device for separating particles from suspension in a fluid is indicated generally at 10. A housing 12 is provided, comprising of a body portion 14 and a removable closure portion 16. The body portion is substantially a cylindrical shell open at the upper end, that is, the body portion 14 comprises a floor and a wall 17. The upper end of the wall 17 of the body portion 14 is formed with a male thread 18 and, directly below the male thread, a circumferential rim 20.

The closure portion 16 is in the form of a screw-on cap comprising a circular planar roof 26 and a circumferential wall 28 extending below the edge of the roof. A thread 22 is formed on the interior surface of the wall 28, for co-operating with the male thread 18 at the upper end of the wall 17 of the housing body portion 14. A plurality of recesses 24 are provided spaced uniformly around the outside of the wall 28 of the closure portion 16 in order to assist a user in gripping the closure portion 16 to effect closure and removal.

A recess 30 is provided around the edge of the underside of the roof 26 of the closure portion 16. A rubber O-ring 32 sits within the recess 30, around half of the height of the O-ring 32 extending below the underside of the roof 26. When the closure portion 16 is screwed onto the body portion 14 of the housing 12, the O-ring 32 is compressed between the roof 26 of the closure portion 16 and the upper edge of the wall 17 of the housing body portion 14, forming a watertight seal.

An inlet and an outlet are provided as first and second hollow cylindrical sockets 96 in the wall 17 of the housing body 14, each extending perpendicular to the same tangent of the cylindrical body, that is, the sockets extend outwardly from the wall of the housing 14 and are parallel to each other on a diameter of the housing 12. John Guest Speedfit® connectors 98 are provided within the sockets 96, allowing easy fitting to a heating circuit.

The parallel inlet and outlet sockets 96 on the same diameter enable easy fitting to a heating circuit, since the inlet and outlet will be in the same straight pipe line when the device is installed.

Deflectors 100, best shown in FIG. 2, are provided within each of the sockets 96 in the cylindrical housing 12. The deflectors 100 block a portion of each socket 96, directing the flow on the inlet to one side and resulting in a swirling flow within the housing 12. The edges of the deflectors 100 are at an angle of around 10° from the vertical, so as to divert water slightly vertically as well as horizontally. Providing deflectors 100 in both sockets 96 allows either to be used as the inlet.

A bleed valve 102 is provided through the center of the screw-on cap 16 and is screwed into a plug 50 within the housing 12. The bleed valve includes a head portion 106 and a body portion 108, the head portion 106 being of greater diameter than the body portion 108, so that the body portion 108 but not the head portion 106 will fit through a circular aperture in the center of the roof 26 of the closure portion 16 of the housing 12. A passage 120 is provided through the center of the head and body portions 106, 108. The head portion 106 is provided with an external screw thread, and a screw-on cap 104 closes the bleed valve, sealed by an O-ring arrangement.

A drain valve 116 comprising of a screw-in plug with seal is provided in the floor of the housing body 14.

In use, the separator device 10 is isolated from the heating circuit, and the bleed valve 102 and drain valve 116 are opened to drain fluid from the housing 12. The drain valve 116 is then closed, and the system can be dosed with a corrosion inhibitor via the bleed valve 102. A supply line can be secured onto the thread of the head portion. The separator device 10 is then reconnected to the heating circuit, air being forced out of the bleed valve 102. When all the air has been removed the bleed valve 102 is closed, and the system refilled and/or re-pressurized as necessary.

Referring now to FIGS. 4-8, an insert 34 is removably contained within the housing 12. The insert comprises a central section 36 formed as a hollow cylinder, a first separation chamber 38 at an upper end of the insert and a second separation chamber 40 at a lower end of the insert, as viewed and installed in the housing. The upper and lower separation chambers 38, 40 are substantially cylindrical and share a central axis with the central section 36. The upper and lower separation chambers 38, 40 are sized to almost completely extend to the full interior diameter of the housing body 14.

Figure 4:
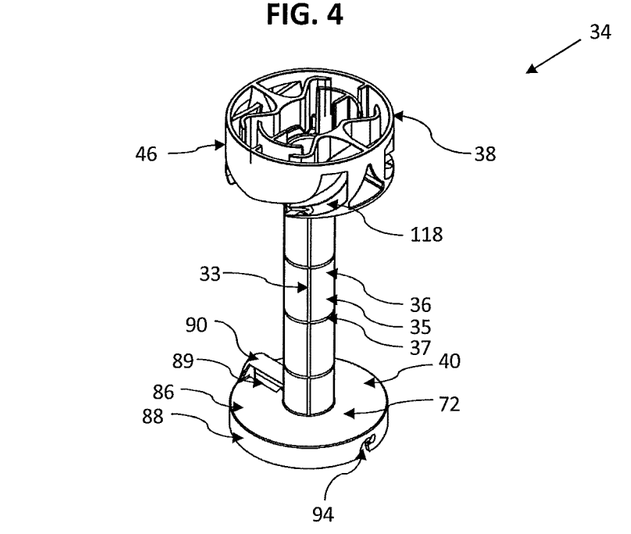
FIG. 4 shows a perspective view of an insert according to the second aspect of the invention, being a component part of the separator device of FIG. 1.
Figure 5:
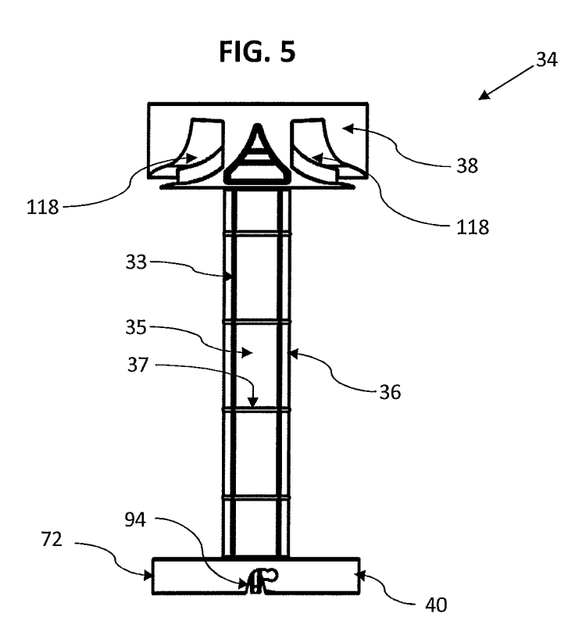
FIG. 5 shows a front view of the insert of FIG. 4.

The hollow cylindrical central section 36 has a curved wall which is approximately 0.65 mm thick. Four equally spaced reinforcing ribs 37 are provided, each around the circumference of the outer surface of the cylindrical central section 36. Four equally spaced reinforcing spines 33 are provided perpendicular to the ribs 37. The ribs 37 and spines 33 define rectangular panels 35.

A cylindrical magnet is provided inside the hollow central section 36 of the insert 34, the central section forming a sheath around the magnet. In use, the magnet attracts ferrous particles which collect in the panels 35 on the outer surface of the central sheath section 36 of the insert 34. When the heating system is serviced, the insert 34 may be removed from the housing 12, and the magnet removed from within the central sheath section 36. With the magnet removed, ferrous particles will easily fall away for disposal.

Figure 6:
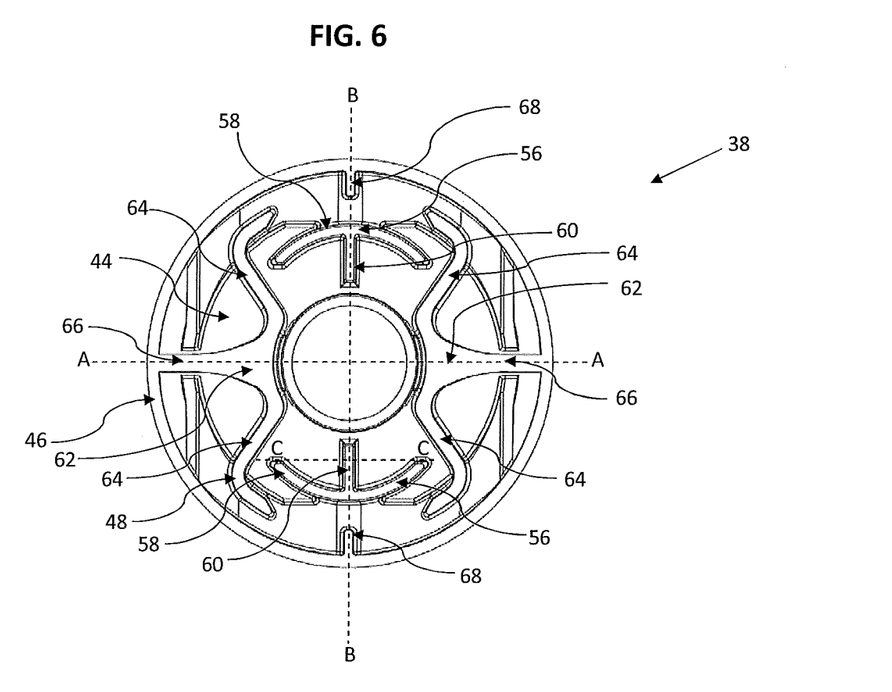
FIG. 6 shows a plan view from above of the insert of FIG. 4.

The upper separation chamber 38 is formed as a cylindrical shell with an open top end, that is, a circular tray having a floor 44 and a single curved wall 46. The floor 44 has a circular aperture at its center which has the same interior diameter as the hollow central section 36 of the sheath 34. Within the upper separation chamber 38, protrusions 48 extend from the floor 44, the protrusions 48 having a vertical extent matching the vertical extent of the wall 46. The protrusions 48 form interior walls which define passageways within the upper separation chamber 38.

The arrangement of the protrusions 48 is best shown in FIG. 6. The arrangement is reflectively symmetrical about two orthogonal axes A-A, B-B. Two protrusions of a first type 56 face each other. The protrusions of the first type 56 are formed of a curved wall 58 comprising substantially 90° of a circle arc, with a radius of curvature slightly smaller than the radius of the upper separation chamber 38, and a straight wall 60 extending inwardly from the center of the curved wall 58 towards the center of the chamber 38. Approximately one third of the length of the straight wall 60 extends beyond a straight line C-C between the ends of the curved section 58. The concave faces of the curved walls 58 face each other.

The protrusions of the first type 56 are positioned with the straight wall 60 on a diameter B-B of the upper separation chamber 38, and so that the curved wall 58 does not touch the wall 46 of the upper separation chamber 38, enabling water to flow around all sides of the protrusions 56.

Two protrusions of a second type 62 face each other at 90° to the protrusions of the first type 56. The protrusions of the second type 62 each comprise a stem 66 extending from the wall 46 of the upper separation chamber 38 towards the center of the chamber 38, and two hook-shaped walls 64. The stem 66 widens as it approaches the center of the upper separation chamber 38. The stem 66 meets the surface of the plug 50, curving around the surface of the plug. The hook-shaped walls 64 extend from either side of the stem 66 where it meets the plug 50, at an angle of around 55° from the stem, so that the hook-shaped walls 64 curve back towards the outside wall 46 of the upper separation chamber 38. Before the hook-shaped walls 64 meet the wall 46 of the upper separation chamber 38, they curve around 90° in the direction away from the stem 66, forming a hooked end. The extent of the hook after the 90° curve is substantially half of the extent of the hook before the curve.

Two straight protrusions 68, having similar vertical extent to the above mentioned protrusions 56, 62 and to the wall 46 of the upper separation chamber 38, are disposed adjacent to the wall 46 on the diameter B-B of the upper separation chamber 38, projecting inwardly towards the center of the upper separation chamber 38.

Four slots 118 are provided in the floor 44 of the upper separation chamber 38. The slots serve to guide a portion of the swirling flow of water within the housing 12 into the upper separation chamber 38, without significantly reducing the overall flow rate in the heating circuit. The slots 118 spiral upwardly into the first separation chamber 38, in opposing arcuate directions, and extend through the side wall 46. That is, two spiral upwardly in one arcuate direction, and the other two in the opposing direction, for guiding flow into the upper separation chamber 38 irrespective of the direction of swirl within the housing 12.

Figure 7:
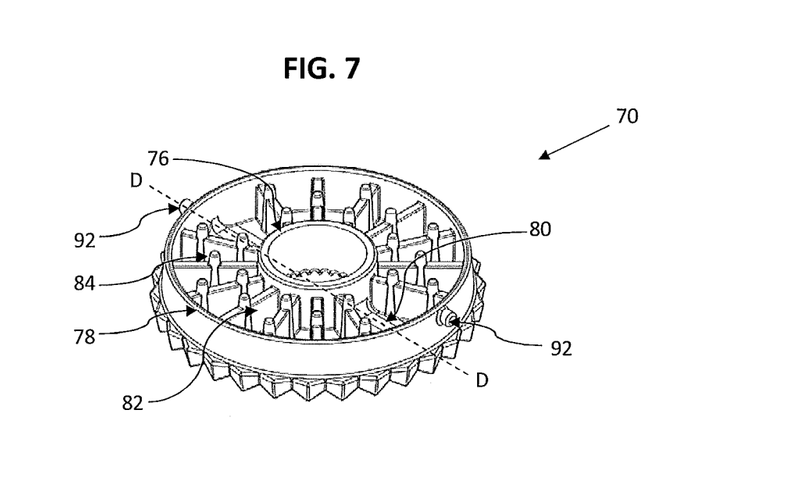
FIG. 7 shows a perspective view of a tray, being a component part of a separator chamber which in turn is a part of the separator device of FIG. 1.

The lower separation chamber 40 is formed as a tray 70, best seen in FIG. 7, which is detachable from a lid 72. The lid 72 is an integral part of the removable insert 34. The tray 70 is toroidal with an inner wall 76, an outer wall 78 and a floor 80. The tray 70 has an outer diameter just less than the interior diameter of the housing body 14 and an inner diameter substantially matching the external diameter of the central section 36 of the removable insert 34.

Figure 8:
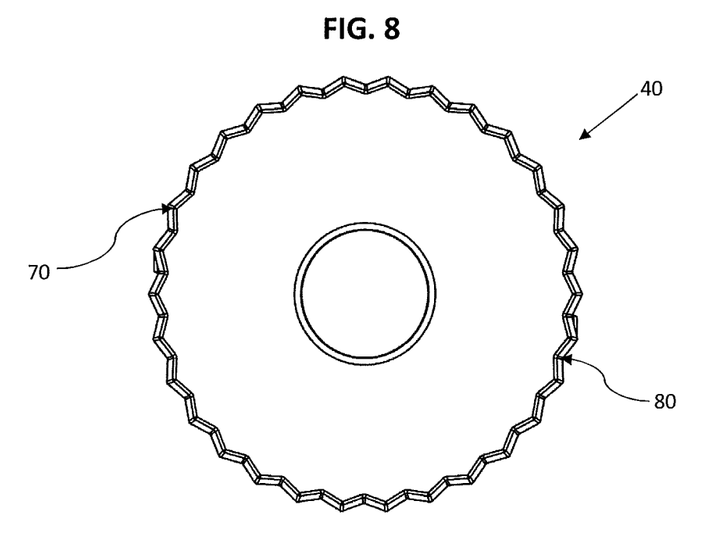
FIG. 8 shows a plan view from below of the tray of FIG. 7.

A plurality of planar walls 82 extend from the tray floor 80, each wall 82 joining the outer tray wall 78 to the inner tray wall 76, and each having a vertical extent just less than the vertical extent of the tray walls 76, 78, so that water can flow over, but not under or around the planar walls 82. The planar walls 82 are fourteen in number, and are spaced evenly around the toroidal tray 70 at sixteenths of its circumference, two sixteenths being without walls 82, those two sixteenths being opposite each other and the arrangement of walls 82 being reflectively and rotationally symmetrical about a diameter D-D upon which the sixteenths without planar walls 82 lie. Thus the planar walls 82 are arranged in two sections, each section having seven walls 82.

Substantially cylindrical protrusions 84 extend from the tray floor 80 and are coincident with the planar walls 82, so that that the cylindrical protrusions 84 extend through and above the substantially planar walls 82. The planar walls 82 at the ends of the sections are coincident with two cylindrical protrusions 84, as is every second wall 82 in each section, the remaining planar walls 82 being coincident with a single cylindrical protrusion 84. Where a planar wall 82 has a single cylindrical protrusion 84, the cylindrical protrusion 84 is at the center of the wall 82, equidistant from the inner and outer walls 76, 78 of the toroidal tray. Where a wall 82 has two cylindrical protrusions 84, the distance between a first cylindrical protrusion and the outer tray wall 78 is equal to the distance between a second cylindrical protrusion and the inner tray wall 76. Each aforementioned distance is approximately one quarter of the distance between the inner and outer walls 76, 78.

The lid 72 of the lower separation chamber 40 is formed as an annular roof 86 surrounding the central section 36 of the insert 34, with a wall 88 extending below the edge of the roof 86. The interior diameter of the lid 72 is substantially matching the exterior diameter of the tray 70 of the lower separation chamber so that the lid 72 fits over the tray 70.

Apertures 89 are provided in the roof 86 of the lid 72 at either side of a radius, and are formed as two elongate rectangles, each with a longitudinal extent just less than the distance between the inner and outer sides of the annular roof 86, and the longitudinal axes of each being parallel with each other. The two rectangular apertures 89 are together reflectively symmetrical about a radial axis halfway between the apertures.

A flow guide 90 extends upwardly from the upper surface of the roof 86 of the lid 72, on the radial axis of symmetry between the apertures, thus forming a wall between the apertures. The flow guide 90 becomes wider as it extends upwards, so that it forms an angled deflector adjacent to and overhanging each aperture. The flow guide 90 therefore deflects a portion of the swirling flow downwards into the lower separation chamber 40, irrespective of the direction of swirl within the housing 12.

On the diameter D-D of the tray 70 which forms the space between the two sections of seven planar walls 82, two cylindrical pins 92 are provided near the top of the outer wall 78, extending outwardly from the outer wall 78. Co-operating slots 94 are provided in the walls 88 of the lid 72 extending vertically from the base of the lid wall and then laterally. In use, the tray 70 is slotted onto the lid 72 and then rotated to lock the tray 70 to the lid 72, in the manner of a bayonet connector.

Referring now to FIGS. 9 to 14, a fitment for fitting the separator device 10 in-line in a central heating circuit is shown generally at 130. The fitment 130 comprises first and second sockets 132 for accepting the open ends of pipes, a screw compression fitting 134 of well-known design on each socket 132 for forming a sealed connection with the pipe ends, and first and second John Guest® Speedfit® connectors 136, fluidly connected respectively to the first and second pipe sockets, for fitting to the Speedfit® connectors 98 in the inlet and outlet 96 on the housing 12 of the separator device 10. A first valve 138 can be operated to break the fluid connection between the first pipe socket 132 and the first Speedfit® connection 136, and a second valve 140 can be operated to break the fluid connection between the second pipe socket 132 and the second Speedfit® connection 136. One of the two sockets 132 has a greater pipe receiving depth than the other, for example, twice the pipe receiving depth.

Figure 9:
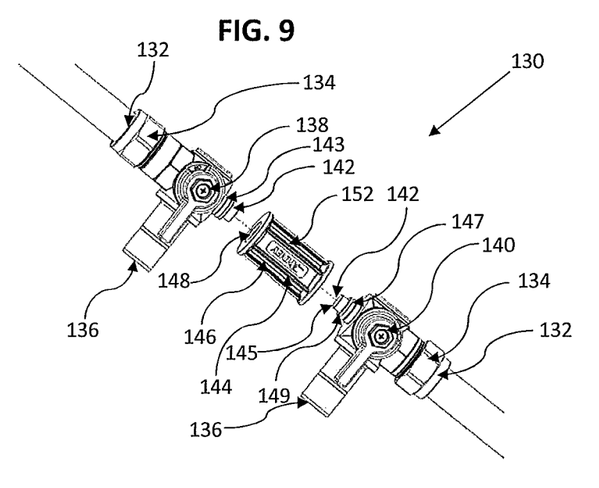
FIG. 9 shows a perspective view of a pipe fitment according to the third aspect of the invention.

Plugs 142 are provided on the backs of the pipe sockets 132. The plugs include a circular section 143 adjacent to the back of the pipe socket 132, and a square dog section 145 at the end of each plug 142. A recess 147 is provided around the curved surface of the circular section 143, and an O-ring 149 fits within the recess, protruding beyond the curved surface.

Figure 10:
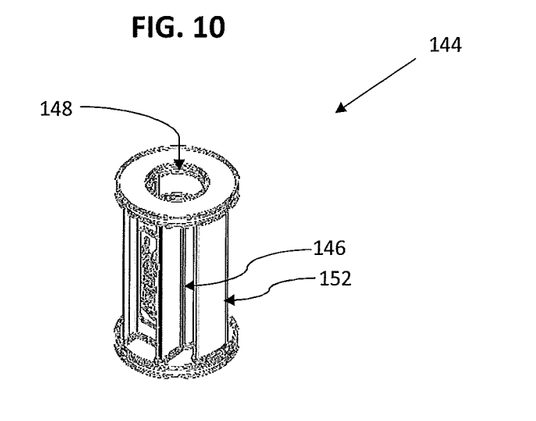
FIG. 10 shows a perspective view of a spacer, being a component part of the pipe fitment of FIG. 9.

A spacer 144 is provided for fitting between the backs of the first and second pipe sockets 132. The spacer 144 is sized to ensure that, when it is fitted, the Speedfit® connectors 136 on the fitment 130 are the same distance apart as the Speedfit® connectors 98 in the sockets 96 on the housing 12 of the separator device 10.

Figure 11:
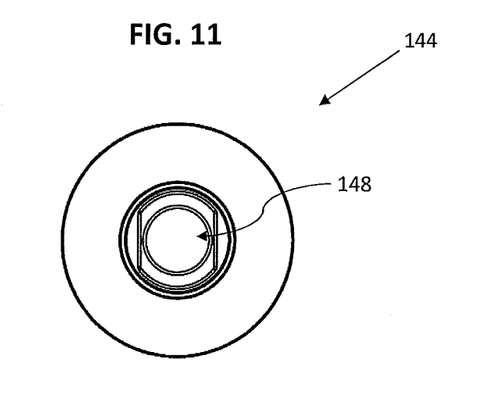
FIG. 11 shows a top plan view of the spacer of FIG. 10.

The spacer 144 is formed substantially as a cylinder. Recesses 146 are provided on an outer wall 152 of the spacer 144 to provide torsional rigidity without increased mass. A socket 148 extends through the spacer from the top to the bottom, and is in the shape of a circle with two opposing truncated segments. At either end of the spacer 144, the socket 148 has sections which are circular without truncated segments. The circular end sections of the socket are sized to receive the circular sections 143 of the plugs 142. The circular sections 143 of the plugs 142 will not fit through the parts of the socket 148 having truncated segments, however the square sections 145 of the plugs 142 do fit into the truncated socket sections.

Figure 12:
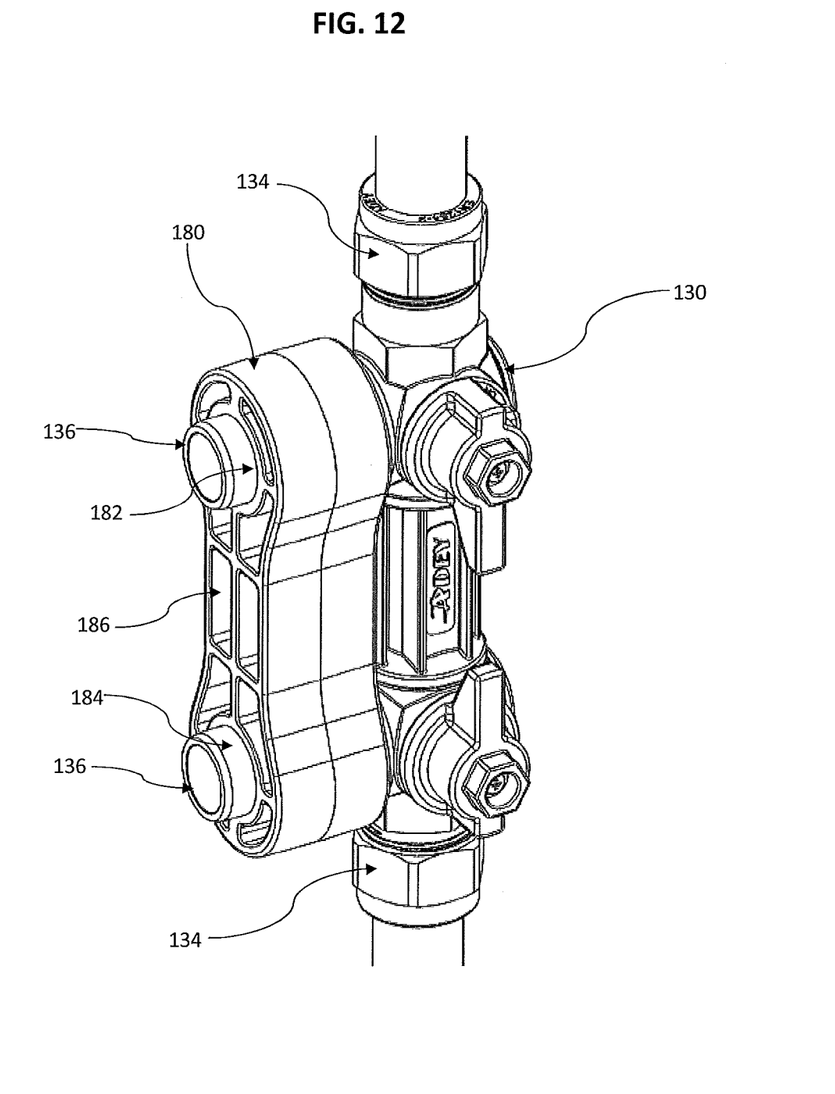
FIG. 12 shows a perspective view of the pipe fitment of FIG. 9, with a fitting jig installed.
Figure 13:
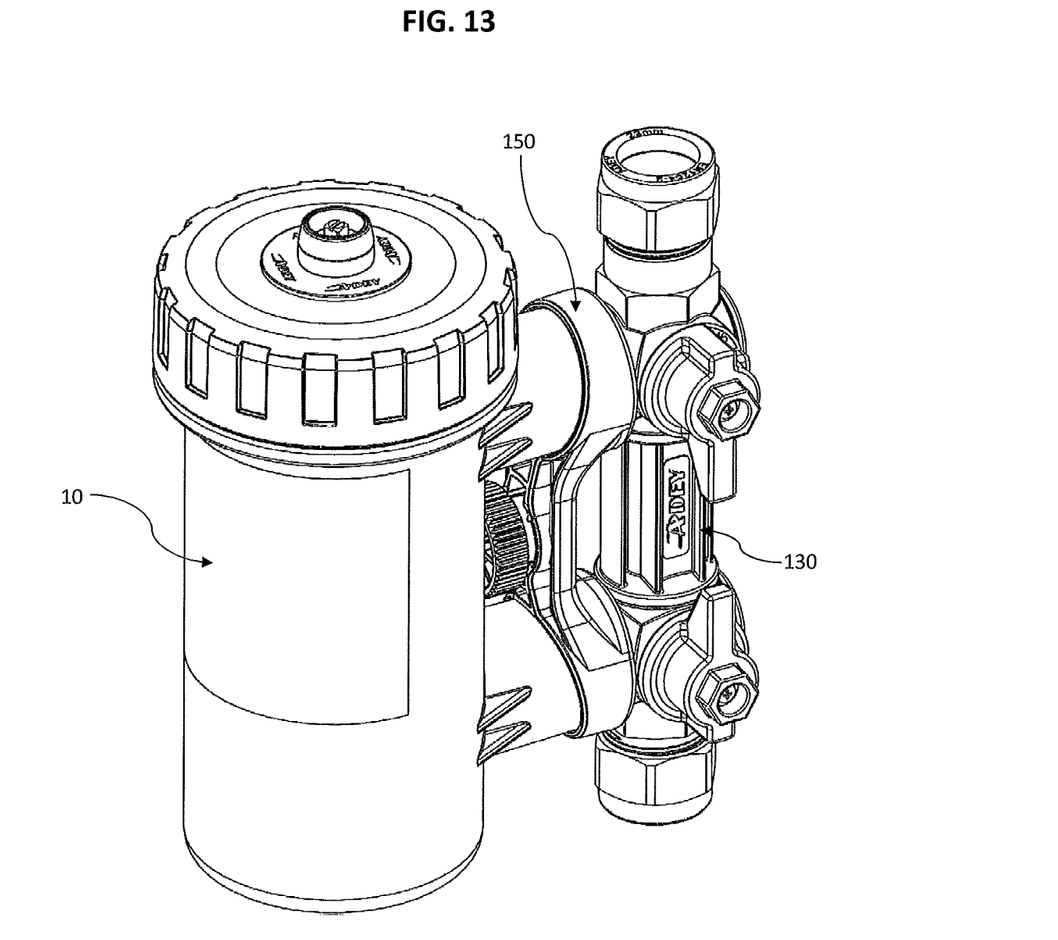
FIG. 13 shows a perspective view of the pipe fitment of FIG. 9, fitted to the separator device of FIG. 1 for installation to a vertical pipe.

When a plug 142 is inserted into a socket 148, the square end dog section 145 of the plug 142 will be received into the portion of the socket 148 which has truncated segments. Turning forces which act upon one of the compression fittings 134 will therefore be transmitted through the spacer to the other compression fitting 134. By using two spanners, the net torque which is transferred to the inlet and outlet 96 of the separator device 10 is substantially reduced, limiting the possibility of damage. Alternatively, the fitment 130 may be provided with a fitting jig 180, as shown in FIG. 12. The fitting jig includes at least two apertures 182 to fit over the connectors 136. The fitting jig ensures that the connectors 136 remain in line, whilst the separator device 10 is not attached. This eliminates any possibility of damaging the separator device 10 while fitting. The dog may have a different cross section if desired, such as a hexagon.

When a plug 142 is inserted fully into a socket 148, the O-ring 149 on the plug 142 acts to retain and align the plug 142 in the socket 148, requiring a positive force for removal.

In use, a section of the central heating flow or return pipe is removed. Where some manipulation of the central heating pipe is possible, the fitment 130 may be installed without removing the spacer 144. The socket 132 with greater pipe receiving depth is installed first, and is slid over the end of the pipe until the socket 132 with lesser pipe receiving depth can face the other open end of pipe. The fitment is then slid in the other direction, over the open pipe end. A fitment installed in this way is shown in FIG. 12, and with filter 10 fitted in FIG. 13.

Figure 14:
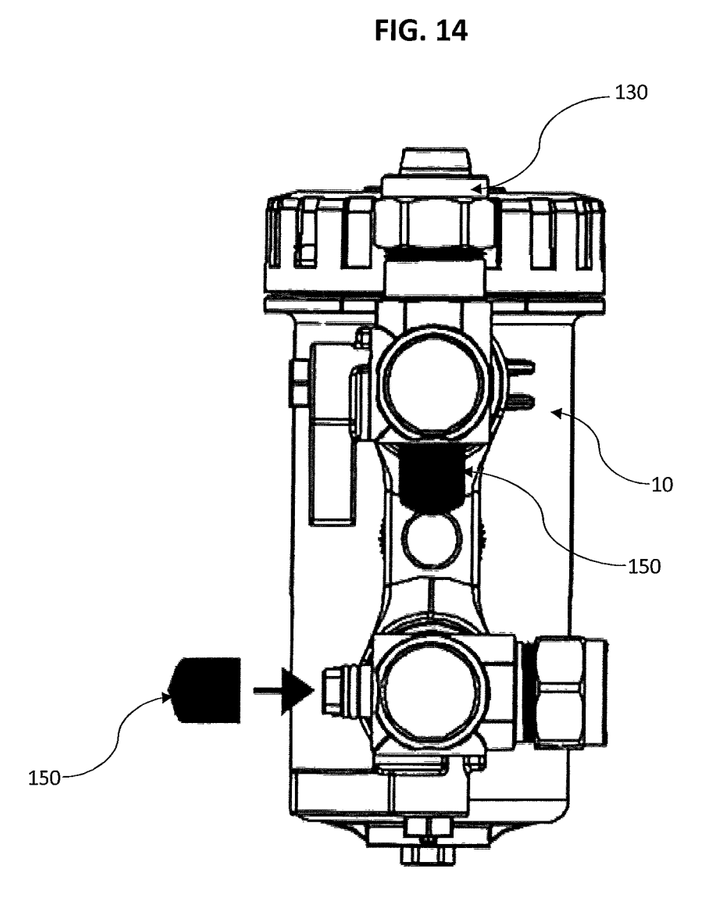
FIG. 14 shows a front plan view of the pipe fitment of FIG. 9, with the spacer removed and fitted to the separator device of FIG. 1 for installation to a vertical pipe and a horizontal pipe.

The spacer 144 may alternatively be removed entirely to allow fitting of the separator device 10 to a non-vertical section of flow or return heating pipe, as shown in FIG. 14. Where the spacer is removed, caps 150 may be fitted over the plugs 142. The connectors 136 may be separately fitted into each of the John Guest® Speedfit® connectors 98 and may be rotated through 360° to suit the angular path of the central heating pipe. For the separator device 10 to be most efficient it must be mounted in a vertical orientation with the bleed valve housing 106 uppermost and the drain valve 116 at the lowest point. The preferred and most common option is to fit to vertical orientation pipe but by removing spacer 144 the separator device 10 can be installed to a non-vertical cut section of central heating pipe by virtue of the flexibility of fitment 130. In FIG. 14, fitment 130 is installed on the separator device 10 to receive a vertical pipe in the upper pipe socket and a horizontal pipe in the lower pipe socket.

By virtue of the inlet and outlet connections being in-line, the separator device 10 is easy to fit. Furthermore, the inlet and outlet can be interchanged, i.e. the flow direction can be changed, and the separator will operate effectively with flow in either direction. All of the separating chambers are able to cope with swirl in both directions within the housing. By providing three chambers filtration is achieved whilst the flow rate is substantially unaffected.

The invention claimed is:

1. A magnetic filter for use in a hydronic heating system, the magnetic filter comprising:
    a housing, having first and second apertures for ingress and egress of fluid into and out of the housing;
    a first separator chamber for removing particles from suspension in the fluid, the first separator chamber being disposed at one end of the housing;
    a second separator chamber for removing particles from suspension in the fluid, the second separator chamber being disposed at the other end of the housing, and
    a central chamber disposed between the first and second separator chambers, a magnet being provided in the central chamber for attracting ferrous particles from fluid in the central chamber,
    the first and second separator chambers each being apertured for ingress of fluid from the central chamber, and the first and second separator chambers each being apertured for egress of fluid to the central chamber, the first separator chamber containing flow obstructions to slow the flow of fluid within the first separator chamber, and the second separator chamber containing flow obstructions to slow the flow of fluid within the second separator chamber.

2. The magnetic filter of claim 1, in which at least one of the first and second separator chambers includes collection areas for collection of particles removed from suspension in the fluid.

3. The magnetic filter of claim 2, in which each of the first and second separator chambers includes collection areas for collection of particles from suspension in the fluid.

4. The magnetic filter of claim 1, in which the flow obstructions in one of the separator chambers include a plurality of substantially planar walls.

5. The magnetic filter of claim 4, in which the planar walls are radially disposed.

6. The magnetic filter of claim 4, in which the flow obstructions in the other separator chamber include a plurality of substantially cylindrical protrusions.

7. The magnetic filter of claim 6, in which the substantially cylindrical protrusions extend through and above the substantially planar walls.

8. The magnetic filter of claim 4, in which the flow obstructions in the other separator chamber include one or more curved walls.

9. The magnetic filter of claim 8, in which the curved walls include at least one wall having two curves in opposite directions to one another.

10. The magnetic filter of claim 4, in which the flow obstructions in the other separator chamber includes a plurality of curved walls forming concave collection areas for collection of particles.

11. The magnetic filter of claim 10, in which the concave collection areas face in different directions.

12. The magnetic filter of claim 1, in which the first and second separator chambers are removable from the housing.

13. The magnetic filter of claim 12, in which the first and second separator chambers are provided as part of a removable insert, the separator chambers being mounted at either end of a central section of the insert.

14. The magnetic filter of claim 1, in which an end of the first separator chamber facing the housing is open.

15. The magnetic filter of claim 1, in which the first chamber has inlets in a side leading from the central chamber.

16. The magnetic filter of claim 15, in which the inlets spiral into the first chamber.

17. The magnetic filter of claim 16, in which the inlets spiral in opposing arcuate directions.

18. The magnetic filter of claim 13, in which the second separator chamber comprises a tray and a roof section.

19. The magnetic filter of claim 18, in which the roof section is attached to the central section of the insert.

20. The magnetic filter of claim 18, in which the tray is removable for cleaning.

21. The magnetic filter of claim 18, in which the apertures for ingress and egress of fluid into and out of the second separator chamber are in the roof section of the second separator chamber.

22. The magnetic filter of claim 18, in which a raised flow guide extends radially from the roof section of the second separator chamber and overhangs each aperture of the second separator chamber in a different direction for directing flow into the second separation chamber from both sides of the flow guide.

23. The magnetic filter of claim 1, in which a bleed valve is provided for releasing air from within the housing.

24. The magnetic filter of claim 1, in which a drain valve is provided for draining fluid from within the housing.

25. The magnetic filter of claim 1, in which a swirl of fluid is set up by means of deflectors mounted within the apertures in the housing.

* * * * *